US007485173B1

(12) United States Patent
Liu et al.

(10) Patent No.: US 7,485,173 B1
(45) Date of Patent: Feb. 3, 2009

(54) CROSS-LINKABLE AND CROSS-LINKED MIXED MATRIX MEMBRANES AND METHODS OF MAKING THE SAME

(75) Inventors: Chunqing Liu, Schaumburg, IL (US); Jeffrey J. Chiou, Irvine, CA (US); Stephen T. Wilson, Libertyville, IL (US)

(73) Assignee: UOP LLC, Des Plaines, IL (US)

( * ) Notice: Subject to any disclaimer, the term of this patent is extended or adjusted under 35 U.S.C. 154(b) by 501 days.

(21) Appl. No.: 11/300,775

(22) Filed: Dec. 15, 2005

(51) Int. Cl.
*B01D 53/22* (2006.01)
*B01D 71/76* (2006.01)

(52) U.S. Cl. .................. 95/45; 95/50; 95/51; 95/54; 95/55; 96/4; 96/8; 96/10; 96/12; 96/13; 96/14; 210/640

(58) Field of Classification Search ............. 95/45, 95/50, 51, 54, 55; 96/4, 7, 8, 10, 11, 12, 96/13, 14; 210/640, 650; 55/DIG. 5
See application file for complete search history.

(56) References Cited

U.S. PATENT DOCUMENTS

| 3,567,632 | A | 3/1971 | Richter et al. ............... 210/23 |
|---|---|---|---|
| 4,230,463 | A | 10/1980 | Henis et al. .................... 55/16 |
| 4,705,540 | A | 11/1987 | Hayes ........................... 55/16 |
| 4,717,393 | A * | 1/1988 | Hayes ............................. 96/4 |
| 4,728,345 | A | 3/1988 | Murphy ........................ 55/158 |
| 4,740,219 | A | 4/1988 | Kulprathipanja et al. ....... 155/16 |
| 4,880,442 | A | 11/1989 | Hayes et al. .................... 55/16 |
| 4,925,459 | A | 5/1990 | Rojey et al. ................... 155/16 |
| 4,968,430 | A | 11/1990 | Hildebrand et al. ........... 210/640 |
| 5,085,676 | A | 2/1992 | Ekiner et al. .................. 55/158 |
| 5,104,532 | A | 4/1992 | Thompson et al. ........... 210/224 |
| 5,127,925 | A | 7/1992 | Kulprathipanja et al. ........ 55/16 |
| 5,288,304 | A | 2/1994 | Koros et al. ..................... 95/45 |
| 5,431,864 | A | 7/1995 | Rao et al. .................. 264/29.5 |
| 5,447,559 | A | 9/1995 | Rao et al. ......................... 96/4 |
| 5,507,856 | A | 4/1996 | Rao et al. ....................... 95/50 |
| 5,538,536 | A | 7/1996 | Fuentes et al. .................. 95/45 |
| 6,048,388 | A | 4/2000 | Schwarz .................. 106/31.27 |
| 6,248,682 | B1 | 6/2001 | Thompson et al. ............. 502/4 |
| 6,500,233 | B1 | 12/2002 | Miller et al. ..................... 95/50 |
| 6,503,294 | B2 * | 1/2003 | Yoshikawa et al. ............. 95/45 |
| 6,503,295 | B1 | 1/2003 | Koros et al. ..................... 95/51 |
| 6,508,860 | B1 | 1/2003 | Kulkarni et al. ................. 95/51 |
| 6,517,606 | B2 * | 2/2003 | Seo et al. ......................... 95/45 |
| 6,562,110 | B2 | 5/2003 | Koros et al. ....................... 96/4 |
| 6,579,343 | B2 | 6/2003 | Brennecke et al. .............. 95/51 |
| 6,585,802 | B2 | 7/2003 | Koros et al. ..................... 95/51 |
| 6,605,140 | B2 | 8/2003 | Fuiver et al. ..................... 96/4 |
| 6,626,980 | B2 | 9/2003 | Hasse et al. ..................... 95/51 |
| 6,663,805 | B1 | 12/2003 | Ekiner et al. ............... 264/45.9 |
| 6,726,744 | B2 | 4/2004 | Kulprathipanja et al. ........ 95/45 |
| 6,740,143 | B2 | 5/2004 | Corbin et al. ................... 96/11 |
| 6,755,900 | B2 * | 6/2004 | Koros et al. ..................... 96/14 |
| 6,863,983 | B2 | 3/2005 | Tsapatsis et al. ............. 428/446 |
| 6,932,859 | B2 * | 8/2005 | Koros et al. ..................... 96/14 |
| 6,946,015 | B2 | 9/2005 | Jorgensen et al. ............... 95/51 |
| 6,997,971 | B1 | 2/2006 | Young et al. .................... 95/45 |
| 7,025,804 | B2 | 4/2006 | Simmons et al. ................ 95/51 |
| 7,109,140 | B2 | 9/2006 | Marand et al. .................. 502/4 |
| 7,138,006 | B2 | 11/2006 | Miller et al. ..................... 95/45 |
| 7,166,146 | B2 | 1/2007 | Miller et al. ..................... 95/45 |
| 2002/0053284 | A1 | 5/2002 | Koros et al. ..................... 95/51 |
| 2003/0220188 | A1 | 11/2003 | Marand et al. ................. 502/60 |
| 2004/0107830 | A1 | 6/2004 | Simmons et al. ................ 95/45 |
| 2004/0147796 | A1 | 7/2004 | Roman et al. ................ 585/144 |
| 2005/0043167 | A1 | 2/2005 | Miller et al. ..................... 502/4 |
| 2005/0139066 | A1 | 6/2005 | Miller et al. ..................... 95/45 |
| 2005/0230305 | A1 | 10/2005 | Kulkarni et al. ......... 210/500.23 |
| 2005/0268782 | A1 | 12/2005 | Kulkarni et al. ................... 96/4 |
| 2006/0107830 | A1 | 5/2006 | Miller et al. ..................... 95/45 |
| 2006/0117949 | A1 | 6/2006 | Kulkarni et al. ................. 95/45 |

(Continued)

FOREIGN PATENT DOCUMENTS

EP    1 1188 477 A1    3/2002

(Continued)

OTHER PUBLICATIONS

"Phthalocyanine-Based Nanoporous Network Polymers" by N.B. McKeown et al., Chem. Commun., 2002, 2780-2781, 2002.

(Continued)

*Primary Examiner*—Jason M Greene
(74) *Attorney, Agent, or Firm*—Mark Goldberg

(57) ABSTRACT

The present invention is for novel high performance cross-linkable and cross-linked mixed matrix membranes and the use of such membranes for separations such as for $CO_2/CH_4$, $H_2/CH_4$ and propylene/propane separations. More specifically, the invention involves the preparation of cross-linkable and cross-linked mixed matrix membranes (MMMs). The cross-linkable MMMs were prepared by incorporating microporous molecular sieves or soluble high surface area microporous polymers (PIMs) as dispersed microporous fillers into a continuous cross-linkable polymer matrix. The cross-linked MMMs were prepared by UV-cross-linking the cross-linkable MMMs containing cross-linkable polymer matrix such as BP-55 polyimide. Pure gas permeation test results demonstrated that both types of MMMs exhibited higher performance for $CO_2/CH_4$ and $H_2/CH_4$ separations than those of the corresponding cross-linkable and cross-linked pure polymer matrices.

17 Claims, No Drawings

U.S. PATENT DOCUMENTS

2007/0022877 A1 2/2007 Marand et al. ............... 95/51
2007/0137477 A1* 6/2007 Freeman et al. ............. 95/45

FOREIGN PATENT DOCUMENTS

WO  WO 2005/012397 A2  2/2005
WO  WO 2007/007051 A1  1/2007

OTHER PUBLICATIONS

"Porphyrin-Based Nanoporous Network Polymers" by N.B. McKeown et al., Chem. Commun., 2002, 2782-2783, 2002.

"A Nanoporous Network Polymer Derived from Hexaazatrinaphthylene with Potential as an Adsorbent and Catalyst Support" by P.M. Budd et al., J. Mater. Chem., 2003, 13, 2721-2726.

"Polymers of Intrinsic Microporosity (PIMs): Robust, Solution-Processable, Organic Nanoporous Materials" by P.M. Budd et al., Chem. Commun., 2004, 230-231.

"Solution-Processed, Organophilic Membrane Derived from a Polymer of Intrinsic Microporosity" by P.M. Budd et al., Adv. Mater. 2004, 16, 456, No. 5, Mar. 5.

"Polymers of Instrinsic Microporosity (PIMs): Bridging the Void Between Microporous and Polymeric Materials" by N.B. McKeown et al., Chem. Eur. J. 2005, 11, 2610-2620.

"Microporous Polymeric Materials" by P.M. Budd et al., Materials Today, Apr. 2004, 40-46.

McKeown et al., Chem. Commun., 2780 (2002).

McKeown et al., Chem. Commun., 2782 (2002).

Budd et al., J. Mater. Chem., 13: 2721 (2003).

Budd et al., Chem. Commun., 230 (2004).

Budd et al., Adv. Mater., 16:456 (2004).

McKeown et al., Chem. Eur. J., 11:2610 (2005).

* cited by examiner

CROSS-LINKABLE AND CROSS-LINKED MIXED MATRIX MEMBRANES AND METHODS OF MAKING THE SAME

FIELD OF THE INVENTION

This invention pertains to mixed matrix membranes having greatly improved performance in separation of gases. More particularly, the invention pertains to cross-linkable and cross-linked mixed matrix membranes containing microporous molecular sieves or high surface area microporous polymers as fillers.

BACKGROUND OF THE INVENTION

In the past 30-35 years, the state of the art of polymer membrane-based gas separation processes has evolved rapidly. Membrane gas separation is of special interest to petroleum producers and refiners, chemical companies, and industrial gas suppliers. Several applications have achieved commercial success, including carbon dioxide removal from natural gas and from biogas and enhanced oil recovery, and also hydrogen removal from nitrogen, methane, and argon in ammonia purge gas streams. For example, UOP's Separex® membrane is currently an international market leader for carbon dioxide removal from natural gas.

The membranes most commonly used in commercial gas separation applications are polymeric and nonporous. Separation is based on a solution-diffusion mechanism. This mechanism involves molecular-scale interactions of the permeating gas with the membrane polymer. The mechanism assumes that in a membrane having two opposing surfaces, each component is sorbed by the membrane at one surface, transported by a gas concentration gradient, and desorbed at the opposing surface. According to this solution-diffusion model, the membrane performance in separating a given pair of gases (e.g., $CO_2/CH_4$, $O_2/N_2$, $H_2/CH_4$) is determined by two parameters: the permeability coefficient (abbreviated hereinafter as $P_A$) and the selectivity ($\alpha_{A/B}$). The $P_A$ is the product of the gas flux and the membrane skin thickness, divided by the pressure difference across the membrane. The $\alpha_{A/B}$ is the ratio of the permeability coefficients of the two gases ($\alpha_{A/B}=P_A/P_B$) where $P_A$ is the permeability of the more permeable gas and $P_B$ is the permeability of the less permeable gas. Gases can have high permeability coefficients because of a high solubility coefficient, a high diffusion coefficient, or because both coefficients are high. In general, the diffusion coefficient decreases while the solubility coefficient increases with an increase in the molecular size of the gas. In high performance polymer membranes, both high permeability and selectivity are desirable because higher permeability decreases the size of the membrane area required to treat a given volume of gas, thereby decreasing capital cost of membrane units, and because higher selectivity results in a higher purity product gas.

Polymers provide a range of properties including low cost, permeability, mechanical stability, and ease of processability that are important for gas separation. A polymer material with a high glass-transition temperature ($T_g$), high melting point, and high crystallinity is preferred. Glassy polymers (i.e., polymers at temperatures below their $T_g$) have stiffer polymer backbones and therefore let smaller molecules such as hydrogen and helium pass through more quickly, while larger molecules such as hydrocarbons pass through more slowly as compared to polymers with less stiff backbones. However, polymers which are more permeable are generally less selective than are less permeable polymers. A general trade-off has always existed between permeability and selectivity (the so-called polymer upper bound limit). See Robeson, J. Membr. Sci., 62 (2): 165 (1991); Robeson, et al., Polymer, 35 (23): 4970 (1994). Over the past 30 years, substantial research effort has been directed to overcoming the limits imposed by this upper bound. Various polymers and techniques have been used, but without much success.

Cellulose acetate (CA) glassy polymer membranes are used extensively in gas separation. Currently, such CA membranes are used for natural gas upgrading, including removal of carbon dioxide. Although CA membranes have many advantages, they are limited in a number of properties including selectivity, permeability, and chemical, thermal, and mechanical stability. One of the immediate challenges that need to be addressed in CA polymer membranes is achieving higher selectivity with equal or greater permeability.

In order to enhance membrane selectivity and permeability, a new type of mixed matrix membranes (MMMs) has recently been developed. Almost all of the MMMs reported to date in the literature are hybrid blend membranes comprising insoluble solid domains such as molecular sieves or carbon molecular sieves embedded in a polymer matrix. Some examples can be seen in the following recent patents and published patent applications: U.S. Pat. No. 6,626,980 B2; US 2003/0220188 A1; US 2005/0043167 A1; U.S. Pat. No. 6,562,110 B1; U.S. Pat. No. 6,755,900 B2; U.S. Pat. No. 6,500,233 B1; U.S. Pat. No. 6,503,295 B1; and U.S. Pat. No. 6,508,860 B1. They combine the low cost and easy processability of the polymer phase with the superior gas separation properties of the molecular sieve phase. These membranes have the potential to achieve higher selectivity with equal or greater permeability compared to existing polymer membranes, while maintaining their advantages. In contrast to the many studies on conventional polymers for membranes, only a few attempts to increase gas separation membrane performance with mixed matrix membranes of zeolite and rubbery or glassy polymers have been reported.

SUMMARY OF THE INVENTION

The present invention is for novel high performance cross-linkable and cross-linked mixed matrix membranes and the use of such membranes for separations such as for $CO_2/CH_4$, $H_2/CH_4$, and olefin/paraffin separations. More specifically, the invention involves the preparation of cross-linkable and cross-linked mixed matrix membranes (MMMs). The cross-linkable MMMs are prepared by incorporating microporous molecular sieves or soluble high surface area microporous polymers (PIMs) as dispersed microporous fillers into a continuous polymer matrix. The cross-linked MMMs are prepared by UV-cross-linking the cross-linkable MMMs containing cross-linkable polymer matrix such as BP-55 polyimide. The microporous molecular sieve fillers provide a number of advantages for the cross-linkable and cross-linked MMMs including high selectivity, high permeability, and high thermal stability. The solubility of the microporous polymeric fillers offers significant advantages over the use of conventional insoluble microporous materials in the preparation of cross-linkable and cross-linked MMMs.

Pure gas permeation test results demonstrate that compared to the pure polymer membranes, the cross-linkable MMMs exhibit a mixed matrix membrane effect by simultaneously increasing selectivity and permeability for both $CO_2/CH_4$ and $H_2/CH_4$ separations. In addition, the pure gas separation performances of the cross-linkable MMMs for $CO_2/$ $CH_4$ and $H_2/CH_4$ separations can reach Robeson's polymer upper bound trade-off curves for both $CO_2/CH_4$ and $H_2/CH_4$ through control of the amount of dispersed fillers. Pure gas permeation test results also demonstrate that the performance of the cross-linkable mixed matrix membranes for propylene/propane separation also can reach polymer upper bound trade-off curve for propylene/propane separation with both high permeability of propylene and high selectivity for propylene/propane. More importantly, pure gas permeation test results show that UV-cross-linked MMMs exhibit more than doubled selectivities for both $CO_2/CH_4$ and $H_2/CH_4$ separations compared to those of the original cross-linkable MMMs. The pure gas separation performances of the cross-linked MMMs for $CO_2/CH_4$ and $H_2/CH_4$ separations are well above the Robeson's polymer upper bound trade-off curves for $CO_2/CH_4$ and $H_2/CH_4$, respectively. The cross-linkable and cross-linked MMMs prepared in accordance with the present invention can also be used in the separation of other gases including the following pairs of gases: carbon dioxide/nitrogen, methane/nitrogen, iso/normal paraffins, and olefin/paraffin such as propylene/propane.

DETAILED DISCUSSION OF INVENTION

Mixed matrix membranes (MMMs) containing microporous solid materials as fillers may retain polymer processability and improve selectivity for gas separation due to the superior molecular sieving and sorption properties of the microporous materials.

The cross-linkable and cross-linked MMMs of the present invention are especially useful in the purification, separation or adsorption of a particular species in the liquid or gas phase. In addition to separation of pairs of gases, these membranes may, for example, be used for the separation of proteins or other thermally unstable compounds, e.g. in the pharmaceutical and biotechnology industries. The membranes may also be used in fermenters and bioreactors to transport gases into the reaction vessel and transfer cell culture medium out of the vessel. Additionally, the membranes may be used for the removal of microorganisms from air or water streams, water purification, ethanol production in a continuous fermentation/membrane pervaporation system, and in detection or removal of trace compounds or metal salts in air or water streams.

These cross-linkable and cross-linked MMMs may also be used in the separation of liquid mixtures by pervaporation, such as in the removal of organic compounds (e.g., alcohols, phenols, chlorinated hydrocarbons, pyridines, ketones) from water such as aqueous effluents or process fluids. A membrane which is ethanol-selective would be used to increase the ethanol concentration in relatively dilute ethanol solutions (5-10% ethanol) obtained by fermentation processes. Further liquid phase examples include the separation of one organic component from another organic component, e.g. to separate isomers of organic compounds. Mixtures of organic compounds which may be separated using membranes made in accordance with the present invention include: ethylacetate-ethanol, diethylether-ethanol, acetic acid-ethanol, benzene-ethanol, chloroform-ethanol, chloroform-methanol, acetone-isopropylether, allylalcohol-allylether, allylalcohol-cyclohexane, butanol-butylacetate, butanol-1-butylether, ethanol-ethylbutylether, propylacetate-propanol, isopropylether-isopropanol, methanol-ethanol-isopropanol, and ethylacetate-ethanol-acetic acid.

The cross-linkable and cross-linked MMMs of the present invention are especially useful in gas separation processes in air purification, petrochemical, refinery, and natural gas industries. Examples of such separations include separation of an organic gas from an atmospheric gas, such as nitrogen or oxygen. Further examples of such separations are for the separation of $CO_2$ from natural gas, $H_2$ from $N_2$, $CH_4$, and Ar in ammonia purge gas streams, $H_2$ recovery in refineries, olefin/paraffin separations such as propylene/propane separation, and iso/normal paraffin separations.

The cross-linkable and cross-linked MMMs of the present invention may be used for separation of organic molecules from water (e.g. ethanol and/or phenol from water by pervaporation) and removal of metal and other organic compounds from water.

An additional application for the membranes is in chemical reactors to enhance the yield of equilibrium-limited reactions by selective removal of a specific product in an analogous fashion to the use of hydrophilic membranes to enhance esterification yield by the removal of water.

The present invention relates to cross-linkable and cross-linked mixed matrix membranes (MMMs) (or cross-linkable and cross-linked mixed matrix dense films) containing microporous molecular sieves or soluble polymers of intrinsic microporosity as fillers. The microporous molecular sieve fillers provide a number of advantages for the cross-linkable and cross-linked MMMs including high selectivity, high permeability, and high thermal stability. The solubility of the microporous polymeric fillers offers significant advantages over the use of conventional insoluble microporous materials in the preparation of cross-linkable and cross-linked MMMs. These new cross-linkable and cross-linked MMMs have immediate applications for the separation of gas mixtures including carbon dioxide removal from natural gas and hydrogen separation from methane. The cross-linkable and cross-linked mixed matrix membranes permit carbon dioxide to diffuse through at a faster rate than the methane in the natural gas. Carbon dioxide has a higher permeation rate than methane because of higher solubility, higher diffusivity, or both. Thus, carbon dioxide enriches on the permeate side of the membrane, and methane enriches on the feed (or reject) side of the membrane.

Any given pair or group of gases that differ in molecular size, for example nitrogen and oxygen, carbon dioxide and methane, hydrogen and methane or carbon monoxide, helium and methane, can be separated using the cross-linkable or cross-linked mixed matrix membranes described herein. More than two gases can be removed from a third gas. For example, some of the components which can be selectively removed from a raw natural gas using the membranes described herein include carbon dioxide, oxygen, nitrogen, water vapor, hydrogen sulfide, helium, and other trace gases. Some of the components that can be selectively retained include hydrocarbon gases.

The cross-linkable and cross-linked MMMs of the present invention comprise dispersed microporous molecular sieve fillers or organic microporous polymer (PIM) fillers throughout a continuous polymer phase. The cross-linkable MMMs were prepared by incorporating microporous fillers into a continuous cross-linkable polymer matrix such as BP-55 polyimide polymer as shown below.

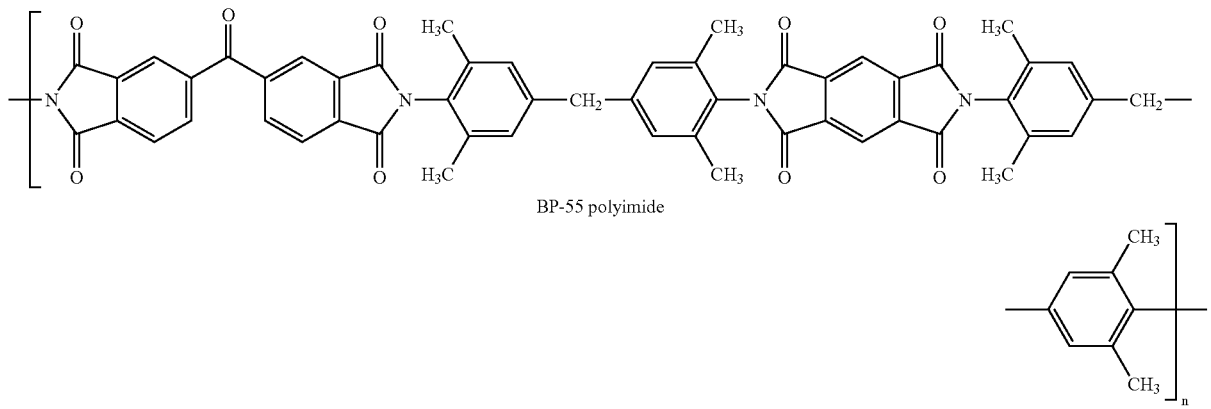

BP-55 polyimide

The cross-linked MMMs were prepared by UV-cross-linking the cross-linkable MMMs. The resulting cross-linkable and cross-linked MMMs have steady state permeabilities that differ from those of the pure cross-linkable polymer and cross-linked polymer, respectively, due to the combination of the molecular sieving gas separation mechanism of the microporous molecular sieve filler phase or organic microporous polymer filler phase with the solution-diffusion gas separation mechanism of the cross-linkable or cross-linked polymer phase.

Design of the cross-linkable and cross-linked MMMs with the superior gas separation properties described herein is based on the choice of the appropriate microporous molecular sieve filler, organic microporous polymer filler and the polymer matrix selection, the permeability and selectivity of the MMM, and the mechanical properties of the MMM. Design of cross-linkable MMMs with the superior gas separation properties described herein is not only based on the proper microporous molecular sieve filler, organic microporous polymer filler selection, but is also critically based on the proper selection of UV-cross-linkable polymer matrix, the permeability and selectivity of the MMM, and the mechanical property of the MMM. Material selection for both polymer matrix phase and filler phase is therefore a key aspect for the preparation of cross-linkable and cross-linked MMMs.

The polymer matrix in cross-linkable MMMs provides a wide range of properties important for membrane separations such as low cost and easy processability and should be selected from polymer materials, which can form cross-linked structure to further improve membrane selectivity. For cross-linkable and cross-linked MMMs applications, it is preferred that a comparable membrane fabricated from the pure polymer, exhibit a carbon dioxide or hydrogen over methane selectivity of at least about 10, more preferably at least about 15. Preferably, the cross-linkable polymer used as the continuous polymer matrix phase in the cross-linked MMMs is a UV-cross-linkable rigid, glassy polymer.

Typical cross-linkable polymers as the continuous polymer matrix phase suitable for the preparation of cross-linkable or cross-linked MMMs comprise polymer chain segments wherein at least a part of these polymer chain segments can be UV-cross-linked to each other through direct covalent bonds by utilizing UV radiation. The UV-cross-linkable polymers can be selected from any polymers containing UV-cross-linkable benzophenone, acrylic, vinyl, styrenic, styrenic-acrylic, sulfonic, 2,3-dihydrofuran group or mixtures of these groups. For example, these UV-cross-linkable polymers can be polyacrylates; polyimides such as poly[1,2,4,5-benzentetracarboxylic dianhydride-co-3,3',4,4'-benzophenonetetracarboxylic dianhydride-co-4,4'-methylenebis(2,6-dimethylaniline)]imides (e.g., BP-55 with 1:1 ratio of 1,2,4,5-benzentetracarboxylic dianhydride and 3,3',4,4'-benzophenonetetracarboxylic dianhydride in this polyimide); poly(styrenes), including styrene-containing copolymers such as acrylonitrilestyrene copolymers, styrene-butadiene copolymers and styrene-vinylbenzylhalide copolymers; polysulfone; and polyethersulfone.

Both the microporous molecular sieve fillers and organic microporous polymer fillers are selected to enhance the separation properties of the membranes.

Microporous molecular sieve materials are defined as solids that contain interconnected pores of less than 2 nanometers in size and consequently possess large and accessible surface areas, typically 300-1500 $m^2g^{-1}$ as measured by gas adsorption. This discrete porosity provides molecular sieving properties to these materials which have found wide applications as catalysts and sorption media. The microporous molecular sieve materials used as dispersed fillers in the cross-linkable and cross-linked MMMs in this invention include small pore molecular sieves such as SAPO-34, Si-DDR, AlPO-14, AlPO-34, AlPO-18, LTA, ERS-12, NaA (4A), CaA (5A), KA (3A), CDS-1, SSZ-62, UZM-9, UZM-13, UZM-17, UZM-19, MCM-65, MCM-47, medium pore molecular sieves such as silicalite-1, Si-MTW, UZM-8, SAPO-31, EU-1, ZSM-57, NU-87, Si-BEA, Si-MEL, and large pore molecular sieves such as FAU, OFF, zeolite L, NaX, NaY, and CaY. All the microporous molecular sieves described herein are dispersible template-removed molecular sieves.

Organic microporous polymer materials (or as so-called "polymers of intrinsic microporosity") described herein are polymeric materials that possess microporosity that is intrinsic to their molecular structures. See McKeown, et al., Chem. Commun., 2780 (2002); McKeown, et al., Chem. Commun., 2782 (2002); Budd, et al., J. Mater. Chem., 13:2721 (2003); Budd, et al., Chem. Commun., 230 (2004); Budd, et al., Adv. Mater., 16:456 (2004); McKeown, et al., Chem. Eur. J., 11:2610 (2005). The polymeric fillers have rigid rod-like, randomly contorted structure to generate intrinsic microporosity. These polymeric fillers of intrinsic microporosity exhibit analogous behavior to that of conventional microporous materials such as large and accessible surface areas, interconnected intrinsic micropores of less than 2 nm in size, as well as high chemical and thermal stability, but, in addition, possess properties of conventional polymers such as good solubility and easy processability. Moreover, these polymeric fillers possess polyether polymer chains that have favorable interaction between carbon dioxide and the ethers. These polymeric fillers also can reduce the hydrocarbon fouling problem typical of polyimide membranes. Their solubility offers significant advantages over conventional insoluble microporous materials in the preparation of uncross-linked and cross-linked MMMs. These organic microporous polymer materials are selected as another type of fillers in the preparation of uncross-linked and cross-linked mixed matrix membranes. Representative examples of organic microporous polymer materials described herein as fillers are shown below (PIMs) followed by (network-PIMs).

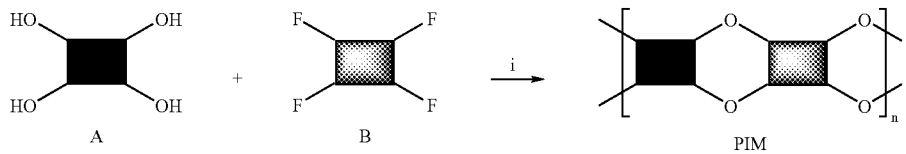

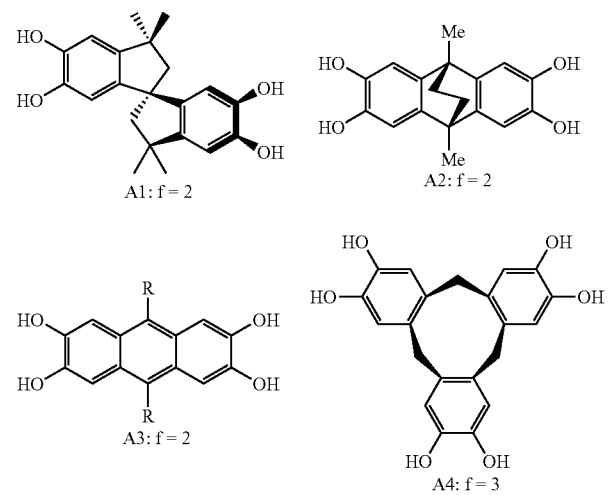

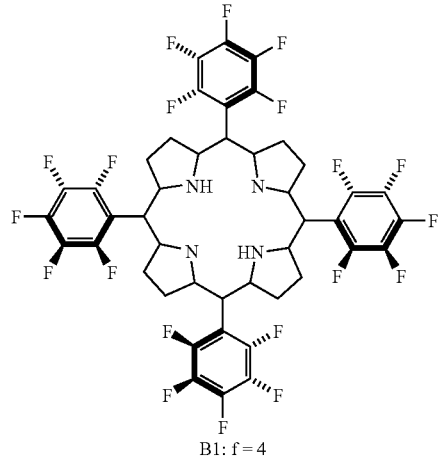

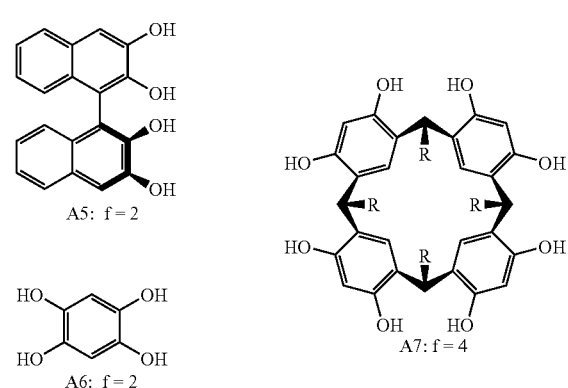

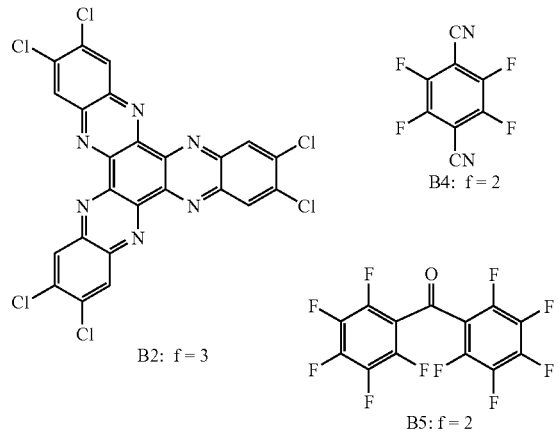

-continued
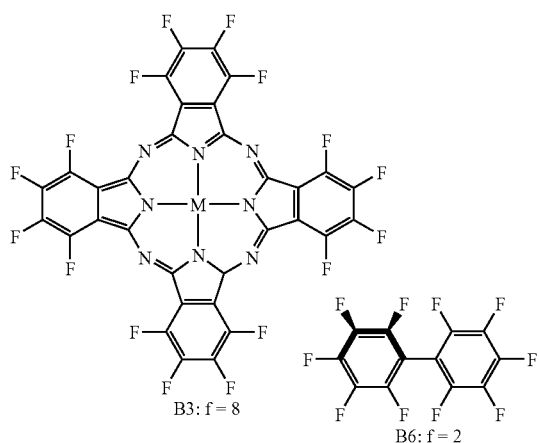
B3: f = 8
B6: f = 2
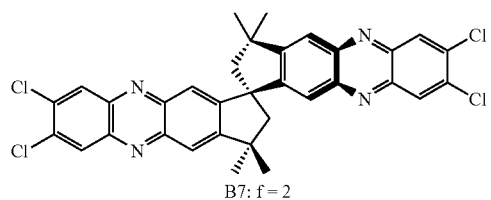
B7: f = 2
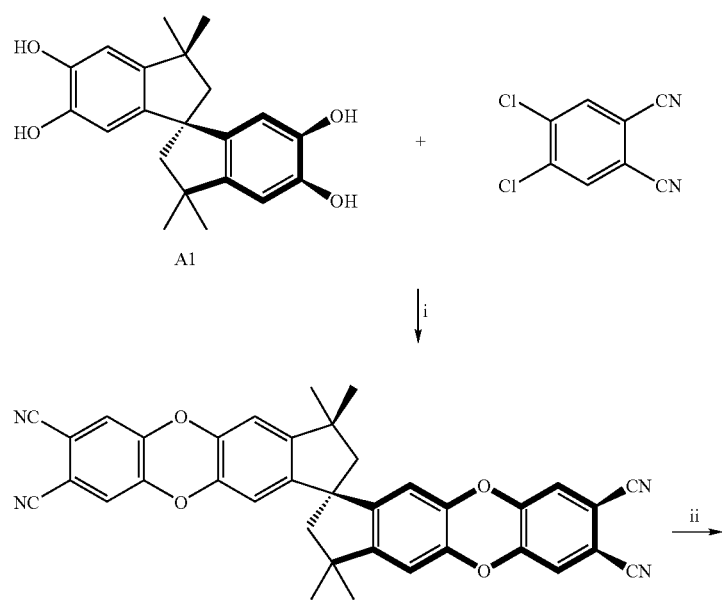

-continued

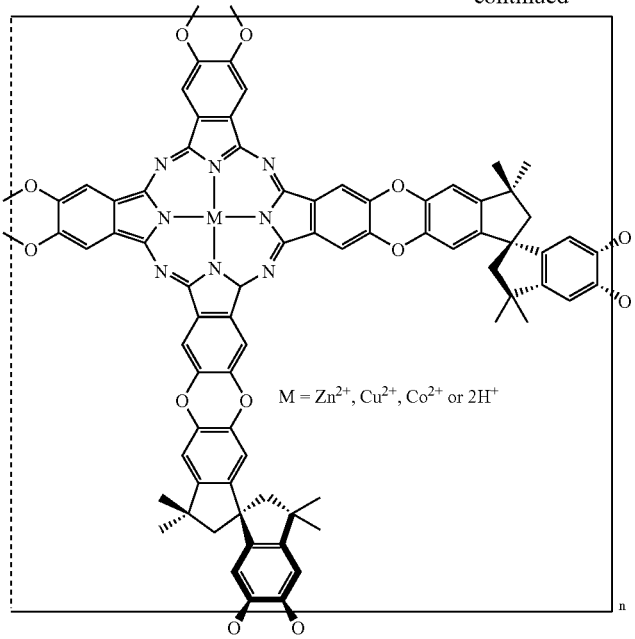

M = Zn$^{2+}$, Cu$^{2+}$, Co$^{2+}$ or 2H$^+$

The cross-linkable mixed matrix membranes used in this present invention containing microporous molecular sieve fillers or organic microporous polymer fillers were fabricated by mixing certain amount of fillers in a continuous polymer matrix. The cross-linkable mixed matrix membranes used in this present invention containing microporous molecular sieve fillers or organic microporous polymer fillers can be fabricated into any convenient geometry such as sheet, hollow fiber, or tube. The most preferred cross-linkable mixed matrix membranes used in this present invention were fabricated as follows.

The cross-linkable microporous molecular sieve/polymer mixed matrix membranes were prepared from solution casting or membrane spinning of template-free microporous molecular sieve fillers dispersed in a solution of polymer such as UV-cross-linkable BP-55. The solvents that can be used for dissolving the continuous polymer matrix include methylene chloride, THF, acetone, DMF, NMP, DMSO, and others known to those skilled in the art. The loading of the microporous molecular sieves in the mixed matrix membranes varied from 1 to 50 wt-% depending upon the properties sought as well as the dispersibility of the particular microporous molecular sieve filler in the particular continuous polymer matrix.

Selected amounts of polymer as matrix were added to an organic solvent. After stirring for 2 hours, the polymer dissolved completely in the solvent to form a transparent homogeneous solution. A measured amount of dry, template-free microporous molecular sieves was then added to the solution. The resulting slurry was stirred and ultrasonicated to ensure a good dispersion of the template-free microporous molecular sieves. The slurry, with a microporous molecular sieve loading of 1, 10, 20, 30, 40, or 50 wt-% (based on weight of polymer matrix), was poured into a glass ring on top of a clean glass plate, and dried at room temperature inside a plastic cover for at least 12 hours to obtain the final mixed matrix membrane. The membrane was detached from the glass plate and dried at room temperature for 24 hours and then at 110° C. for at least 48 hours under vacuum. The membrane was then cut into a small circle for gas separation measurements.

The cross-linkable organic microporous polymer/polymer mixed matrix membranes were prepared from solution casting or membrane spinning of a homogeneous solution of microporous polymer fillers and a continuous polymer matrix. The solvents that can be used for dissolving both microporous polymer fillers and the continuous polymer matrix include methylene chloride, tetrahydrofuran (THF), acetone, dimethylformamide (DMF), N-Methyl-2-Pyrrolidone (NMP), dimethyl sulfoxide DMSO, and others known to those skilled in the art. The loading of the microporous polymer fillers in the mixed matrix membranes may vary from 1 to 99 wt-% depending upon the properties sought as well as the dispersibility of the particular microporous polymer filler in the particular continuous polymer matrix.

A similar procedure was used to add microporous polymer fillers. Selected amounts of microporous polymer fillers and polymer matrix were added to an organic solvent. After stirring for 2 hours, both polymers dissolved completely in the solvent to form a transparent homogeneous solution. The polymer solution with microporous polymer filler loading of 1, 10, 20, 30, 40, or 50 wt-% (based on weight of polymer matrix) was poured into a glass ring on top of a clean glass plate, and dried at room temperature inside a plastic cover for at least 12 hours to obtain the final mixed matrix membrane. The membrane was detached from the glass plate and dried at room temperature for 24 hours and then at 110° C. for at least 48 hours under vacuum. The membrane was then cut into a small circle for gas separation measurements.

The cross-linked mixed matrix membranes including both the microporous molecular sieve/polymer and organic microporous polymer/polymer cross-linked mixed matrix membranes are prepared by further UV-cross-linking of the microporous molecular sieve/polymer or organic microporous polymer/polymer uncross-linked mixed matrix membranes containing UV-cross-linkable polymer matrices from a certain distance and for a certain period of time depending upon the separation properties sought. The cross-linked mixed matrix membranes including both the microporous molecular sieve/polymer and organic microporous polymer/polymer cross-linked mixed matrix membranes can be used in any convenient geometry such as sheet, hollow fiber, or tube.

The permeability coefficient ($P_A$) and selectivity ($\alpha_{A/B}$) of the cross-linkable and cross-linked mixed matrix membranes (or mixed matrix dense films) were measured by pure gas measurements at 50° C. under about 100 psig pressure.

It has been demonstrated from pure gas permeation results that the cross-linkable mixed matrix membranes exhibited a mixed matrix membrane effect for $CO_2/CH_4$ separation with both improved permeability of $CO_2$ ($P_{CO2}$) and selectivity of $CO_2/CH_4$ ($\alpha_{CO2/CH4}$). For example, as shown in Table 1, for the 30%-AlPO-18-BP-55 mixed matrix membrane with 30 wt-% of AlPO-18 fillers in BP-55 polymer matrix, the $P_{CO2}$ increased 57% compared to that of pure BP-55 membrane, and in the meantime the $\alpha_{CO2/CH4}$ increased about 17%. These results indicate that the intrinsic gas transport properties of the microporous molecular sieve fillers and polymer matrix phase determine the effective extremely high permeability of the cross-linkable mixed matrix membranes.

TABLE 1

Pure gas permeation results of cross-linkable MMMs for $CO_2/CH_4$ separation*

| Film | $P_{CO2}$ | $P_{CO2}$ increased | $P_{CH4}$ | Selectivity ($\alpha_{CO2/CH4}$) | $\alpha_{CO2/CH4}$ increased |
|---|---|---|---|---|---|
| Pure BP-55 | 60.8 | — | 3.00 | 20.3 | — |
| 30%-AlPO-18-BP-55 | 95.4 | 57% | 4.03 | 23.7 | 16.7% |
| 40%-AlPO-18-BP-55 | 123.2 | 103% | 5.24 | 23.5 | 15.8% |

*Testing conditions: Pure gas permeation, 50° C., ~100 psig.

For $H_2/CH_4$ separation, it also has been proven from measurement of pure gas permeation results that cross-linkable mixed matrix membranes exhibit a mixed matrix membrane effect with both improved permeability of $H_2$ ($P_{H2}$) and selectivity of $H_2/CH_4$ ($\alpha_{H2/CH4}$). For example, as shown in Table 2, for the 40%-AlPO-18-BP-55 mixed matrix membrane with 40 wt-% of AlPO-18 fillers in BP-55 polymer matrix, the $P_{H2}$ increased 116% compared to that of pure BP-55 membrane, and in the meantime the $\alpha_{H2/CH4}$ increased about 24%. It also has been shown that the separation performance of 40%-AlPO-18-BP-55 mixed matrix membrane for $H_2/CH_4$ separation has reached the Robeson's polymer upper bound limit.

TABLE 2

Pure gas permeation results of cross-linkable MMMs for $H_2/CH_4$ separation*

| Film | $P_{H2}$ | $P_{H2}$ increased | $P_{CH4}$ | Selectivity ($\alpha_{H2/CH4}$) | $\alpha_{H2/CH4}$ increased |
|---|---|---|---|---|---|
| Pure BP-55 | 106.2 | — | 3.00 | 35.4 | — |
| 30%-AlPO-18-BP-55 | 163.4 | 54% | 4.03 | 40.5 | 14.4% |
| 40%-AlPO-18-BP-55 | 229.7 | 116% | 5.24 | 43.8 | 23.7% |

*Testing conditions: Pure gas permeation, 50° C., ~100 psig.

For propylene/propane separation, it also has been demonstrated from pure gas permeation results that cross-linkable mixed matrix membranes have propylene/propane separation performance reaching polymer upper bound trade-off curve. For example, as shown in Table 3, for the 30% AlPO-14-BP-55 mixed matrix membrane with 30 wt-% of AlPO-14 microporous molecular sieve fillers in BP-55 polymer matrix, the permeability of propylene is higher than 15 barrers and the selectivity of propylene/propane is higher than 11 under testing conditions of 50° C. and 30 psig, which are very promising for separation of propylene/propane.

TABLE 3

Pure gas permeation results of cross-linkable MMMs for propylene/propane separation

| Film | Permeability (P, barrer) | | Selectivity |
|---|---|---|---|
| | $P_{propylene}$ | $P_{propane}$ | ($\alpha_{propylene/propane}$) |
| 30%-AlPO-14-BP-55[a] | 15.6 | 1.40 | 11.1 |
| 30%-AlPO-14-BP-55[b] | 12.8 | 1.73 | 7.4 |

[a]Testing conditions: Pure gas permeation, 50° C., ~30 psig.
[b]Testing conditions: Pure gas permeation, 50° C., ~100 psig.

In order to further improve the separation performance of the cross-linkable mixed matrix membranes described in this invention, UV-cross-linking on these membranes was performed. The resulting cross-linked mixed matrix membranes contain cross-linked polymer chains with polymer chain segments cross-linked to each other through direct covalent bonds.

Table 4 shows the pure gas permeation results for the UV-cross-linked mixed matrix membranes for $CO_2/CH_4$ separation. It can be seen from Table 4 that the UV-cross-linked mixed matrix membranes exhibit higher performance than the UV-cross-linked pure BP-55 polymer membrane. The UV-cross-linked mixed matrix membranes show increased $P_{CO2}$ without loss of $\alpha_{CO2/CH4}$. Most importantly, the UV-cross-linked mixed matrix membranes show doubled $\alpha_{CO2/CH4}$ compared to the corresponding cross-linkable mixed matrix membranes. For example, the UV-cross-linked 30%-AlPO-18-BP-55 mixed matrix membrane with UV radiation for 10 min exhibited 48% of $P_{CO2}$ increase without loss of $\alpha_{CO2/CH4}$ compared to those of the 10 min UV-cross-linked BP-55 pure polymer membrane. Furthermore, the UV-cross-linked 30%-AlPO-18-BP-55 mixed matrix membrane with UV radiation for 10 min exhibited doubled $\alpha_{CO2/CH4}$ (Table 4) compared to the corresponding cross-linkable 30%-AlPO-18-BP-55 mixed matrix membrane (Table 1). In addition, the pure gas separation performance of the cross-linked 30%-AlPO-18-BP-55 mixed matrix membrane for $CO_2/CH_4$ separation is well above the Robeson's polymer upper bound trade-off curve.

TABLE 4

Pure gas permeation results of cross-linked MMMs for $CO_2/CH_4$ separation*

| Film | $P_{CO2}$ | $P_{CO2}$ increased | $P_{CH4}$ | Selectivity ($\alpha_{CO2/CH4}$) |
|---|---|---|---|---|
| UV-10 min cross-linked pure BP-55 | 29.4 | — | 0.672 | 43.7 |
| UV-10 min cross-linked 30%-AlPO-18-BP-55 | 43.6 | 48% | 0.937 | 46.5 |
| UV-20 min cross-linked pure BP-55 | 16.3 | — | 0.300 | 54.3 |
| UV-20 min cross-linked 30%-AlPO-18-BP-55 | 23.1 | 42% | 0.437 | 52.8 |

*Testing conditions: Pure gas permeation, 50° C., 100 psig.

Table 5 shows the pure gas permeation results for the UV-cross-linked mixed matrix membranes for $H_2/CH_4$ separation. It can be seen from Table 5 that the UV-cross-linked mixed matrix membranes exhibit higher performance than the UV-cross-linked pure BP-55 polymer membrane for $H_2/CH_4$ separation. The UV-cross-linked mixed matrix membranes show >50% greatly increased $P_{H2}$ without loss of $\alpha_{H2/CH4}$. Most importantly, the UV-cross-linked mixed matrix membranes show more than three times higher $\alpha_{H2/CH4}$ compared to the corresponding cross-linkable mixed matrix membranes. For example, the UV-cross-linked 30%-AlPO-18-BP-55 mixed matrix membrane with UV radiation for 10 min exhibited 58% of $P_{H2}$ increase with also slightly increased $\alpha_{H2/CH4}$ compared to those of the 10 min UV-cross-linked BP-55 pure polymer membrane (Table 5). Furthermore, the UV-cross-linked 30%-AlPO-18-BP-55 mixed matrix membrane with UV radiation for 10 min exhibited three times higher $\alpha_{H2/CH4}$ (Table 5) compared to the corresponding cross-linkable 30%-AlPO-18-BP-55 mixed matrix membrane (Table 2). In addition, the pure gas separation performance of the cross-linked 30%-AlPO-18-BP-55 mixed matrix membrane for $H_2/CH_4$ separation is well above the Robeson's polymer upper bound trade-off curve.

TABLE 5

Pure gas permeation results of cross-linked MMMs for $H_2/CH_4$ separation*

| Film | Permeability (P, barrer) | | | Selectivity ($\alpha_{H2/CH4}$) |
|---|---|---|---|---|
| | $P_{H2}$ | $P_{H2}$ increased | $P_{CH4}$ | |
| UV-10 min cross-linked pure BP-55 | 98.1 | — | 0.672 | 146.0 |
| UV-10 min cross-linked 30%-AlPO-18-BP-55 | 155.0 | 58% | 0.937 | 165.4 |
| UV-20 min cross-linked pure BP-55 | 92.7 | — | 0.300 | 309.1 |
| UV-20 min cross-linked 30%-AlPO-18-BP-55 | 144.3 | 56% | 0.437 | 330.2 |

*Testing conditions: Pure gas permeation, 50° C., ~100 psig.

Pure gas permeation test results demonstrated that the cross-linkable mixed matrix membranes exhibited a mixed matrix membrane effect with both improved permeability of $CO_2$ and selectivity of $CO_2/CH_4$ for $CO_2/CH_4$ separation and both improved permeability of $H_2$ and selectivity of $H_2/CH_4$ for $H_2/CH_4$ separation. It also has been shown that the separation performance of some cross-linkable mixed matrix membrane for $H_2/CH_4$ separation can reach the Robeson's polymer upper bound trade-off curve.

Pure gas permeation test results on the cross-linked mixed matrix membranes have doubled selectivity of $CO_2/CH_4$ and three times higher selectivity of $H_2/CH_4$ compared to those of the cross-linkable mixed matrix membranes suggesting promising applications for both carbon dioxide removal from natural gas and hydrogen removal from methane. In addition, the pure gas separation performances of the cross-linked mixed matrix membranes for both $CO_2/CH_4$ and $H_2/CH_4$ separations are well above the Robeson's polymer upper bound trade-off curves for $CO_2/CH_4$ and $H_2/CH_4$, respectively.

Both the cross-linkable and cross-linked mixed matrix membranes prepared in accordance with the present invention have promising applications for separations such as for $CO_2$ removal from natural gas, $H_2$ recovery from $CH_4$, $CO_2$ removal from nitrogen, methane separation from nitrogen, iso/normal paraffin separations, and olefin/paraffin separations such as propylene/propane separation.

What is claimed is:

1. A process for separating at least one gas from a mixture of gases, the process comprising:
   a) providing a mixed matrix membrane comprising a UV-cross-linkable or UV-cross-linked polymer as a continuous phase and a microporous material dispersed in the continuous phase wherein said mixed matrix membrane is permeable to said at least one gas and wherein said microporous polymer material consists essentially of organic macromolecules comprised of first generally planar species connected by rigid linkers predominantly to a maximum of two other said first species, said rigid linkers having a point of contortion such that two adjacent first planar species connected by the linker are held in non-coplanar orientation;
   b) contacting the mixture of gases to a first side of the mixed matrix membrane to cause said at least one gas to permeate the mixed matrix membrane; and
   c) removing from a second side of the membrane a permeate gas composition comprising at least a portion of said at least one gas which permeated said membrane.

2. The process of claim 1 wherein said mixed matrix membrane has been exposed to ultraviolet radiation for a sufficient period of time to cause said UV-cross-linkable polymer to be cross-linked.

3. The process of claim 1 wherein said UV-cross-linkable polymer is a UV-cross-linkable rigid, glassy polymer.

4. The process of claim 3 wherein said UV-cross-linkable rigid, glassy polymer is selected from the group consisting of benzophenone, acrylic, vinyl, styrenic, styrenic-acrylic, sulfonic, and 2,3-dihydrofuran containing polymers.

5. The process of claim 3 wherein said UV-cross-linkable polymer is selected from the group consisting of polyacrylates; polyimides; poly(styrenes), styrene-containing copolymers; polysulfone; and polyethersulfone.

6. The process of claim 1 wherein said mixture of gases comprises a pair of gases selected from the group consisting of carbon dioxide/natural gas, hydrogen/methane, carbon dioxide/nitrogen, methane/nitrogen, iso/normal paraffins and olefins/paraffins.

7. The process of claim 2 wherein said UV-cross-linkable polymer is exposed to UV light for a period of time between about 5 to 30 minutes.

8. A mixed matrix membrane comprising a UV-cross-linkable or UV-cross-linked continuous phase organic polymer and a microporous material dispersed in said cross-linkable or cross-linked continuous phase organic polymer wherein said microporous polymer material consists essentially of organic macromolecules comprised of first generally planar species connected by rigid linkers predominantly to a maximum of two other said first species, said rigid linkers having a point of contortion such that two adjacent first planar species connected by the linker are held in non-coplanar orientation.

9. The mixed matrix membrane of claim 8 wherein said UV-cross-linkable polymer is selected from the group consisting of benzophenone, acrylic, vinyl, styrenic, styrenic-acrylic, sulfonic, and 2,3-dihydrofuran containing polymers.

10. The mixed matrix membrane of claim 8 wherein said UV-cross-linkable polymer is selected from the group consisting of polyacrylates; polyimides, poly(styrenes), styrene-containing copolymers; polysulfone; and polyethersulfone.

11. The mixed matrix membrane of claim 8 wherein said mixed matrix membrane has a geometry selected from the group consisting of sheets, hollow fibers and tubes.

12. A method of making a mixed matrix membrane comprising:

providing a UV-cross-linkable continuous phase organic polymer;

providing a microporous material wherein said microporous polymer material consists essentially of organic macromolecules comprised of first generally planar species connected by rigid linkers predominantly to a maximum of two other said first species, said rigid linkers having a point of contortion such that two adjacent first planar species connected by the linker are held in non-coplanar orientation;

dispersing the microporous material into a solution containing the continuous phase organic polymer;

allowing the continuous phase organic polymer to solidify about the microporous material to produce a mixed matrix membrane; and exposing said continuous phase organic polymer to UV radiation for a sufficient period of time to cross-link said continuous phase organic polymer.

13. The method of claim 12 wherein said UV-cross-linkable continuous phase organic polymer is selected from the group consisting of benzophenone, acrylic, vinyl, styrenic, styrenic-acrylic, sulfonic, and 2,3-dihydrofuran containing polymers.

14. The method of claim 12 wherein said UV-cross-linkable continuous phase organic polymer is selected from the group consisting of polyacrylates; polyimides; poly(styrenes), styrene-containing copolymers; polysulfone; and polyethersulfone.

15. The process of claim 5 wherein said polyimide is selected from the group consisting of poly[1,2,4,5-benzentetracarboxylic dianhydride-co-3,3',4,4'-benzophenonetetracarboxylic dianhydride-co-4,4'-methylenebis(2,6-dimethylaniline)]imides, and BP-55.

16. The mixed matrix membrane of claim 10 wherein said polyimide is selected from the group consisting of poly[1,2,4,5-benzentetracarboxylic dianhydride-co-3,3',4,4'-benzophenonetetracarboxylic dianhydride-co-4,4'-methylenebis(2,6-dimethylaniline)]imides, and BP-55.

17. The method of claim 14 wherein said polyimide is selected from the group consisting of poly[1,2,4,5-benzentetracarboxylic dianhydride-co-3,3',4,4'-benzophenonetetracarboxylic dianhydride-co-4,4'-methylenebis(2,6-dimethylaniline)]imides, and BP-55.

* * * * *